(12) United States Patent
Lutnick et al.

(10) Patent No.: US 10,062,111 B2
(45) Date of Patent: Aug. 28, 2018

(54) SYSTEM AND METHODS FOR FACILITATING OPTIONS AND/OR FUTURES

(75) Inventors: Howard W. Lutnick, New York, NY (US); Rich Jaycobs, Siasconset, MA (US); James Leslie Walker, Maynard, MA (US)

(73) Assignee: CFPH, LLC, New York, NY (US)

( * ) Notice: Subject to any disclaimer, the term of this patent is extended or adjusted under 35 U.S.C. 154(b) by 734 days.

(21) Appl. No.: 13/249,771

(22) Filed: Sep. 30, 2011

(65) Prior Publication Data

US 2012/0221456 A1 Aug. 30, 2012

Related U.S. Application Data

(60) Provisional application No. 61/389,529, filed on Oct. 4, 2010.

(51) Int. Cl.
*G06Q 40/04* (2012.01)

(52) U.S. Cl.
CPC .................................... *G06Q 40/04* (2013.01)

(58) Field of Classification Search
CPC .............................. G06Q 40/04; G06Q 40/06
USPC ........................................... 705/35, 36 R, 37
See application file for complete search history.

(56) References Cited

U.S. PATENT DOCUMENTS

| | | | | |
|---|---|---|---|---|
| 2001/0042036 A1* | 11/2001 | Sanders | ................ | G06Q 40/04 705/36 R |
| 2003/0088499 A1* | 5/2003 | Gilbert | ................ | G06Q 40/04 705/37 |
| 2005/0165669 A1* | 7/2005 | Montanaro | ............ | G06Q 40/04 705/37 |
| 2005/0239523 A1* | 10/2005 | Longman | .............. | G06F 3/0219 463/9 |
| 2006/0015434 A1* | 1/2006 | Lutnick | .............. | G06Q 30/0633 705/35 |
| 2006/0036531 A1 | 2/2006 | Jackson et al. | | |
| 2006/0149654 A1* | 7/2006 | Burns | ...................... | G06F 3/016 705/37 |
| 2007/0226127 A1* | 9/2007 | Kirwin | ................ | G06F 3/04895 705/37 |
| 2008/0082436 A1 | 4/2008 | Shalen | | |
| 2009/0024543 A1 | 1/2009 | Horowitz | | |
| 2011/0093374 A1* | 4/2011 | Messina | ................ | G06F 3/0481 705/37 |
| 2011/0125626 A1* | 5/2011 | Shalen | .................. | G06Q 40/04 705/37 |
| 2011/0270734 A1* | 11/2011 | Gershon | ................ | G06Q 30/08 705/37 |

FOREIGN PATENT DOCUMENTS

| | | | | |
|---|---|---|---|---|
| EP | 1304641 A1 * | 4/2003 | ............. | G06Q 40/04 |
| WO | WO-2004088460 A2 * | 10/2004 | ............. | G06Q 40/02 |

OTHER PUBLICATIONS

International Search Report, PCT/US2011/054575, dated Dec. 28, 2012.*

(Continued)

*Primary Examiner* — Bijendra K Shrestha
(74) *Attorney, Agent, or Firm* — Mark Miller

(57) ABSTRACT

Some embodiments may include allowing users to define and/or trade in binary options and/or other financial instruments. Various methods and apparatus are described.

20 Claims, 3 Drawing Sheets

(56) References Cited

OTHER PUBLICATIONS

Aptara: Chapter 14—Graphical User Interface Feb. 15, 2010, pp. 822-885 (Year: 2010).*
Dobbs, H: Separable User Interfaces and Interaction Controls, Nov. 2002, Master Thesis, pp. 1-84 (Year: 2002).*
Australian Exam Report for Application No. 2011312390 dated Jul. 1, 2014 (3 pages).
Australian Notice of Acceptance for Application No. 2011312390 dated Apr. 1, 2014 (2 pages).
Australian Exam Report for Application No. 2016204756 dated Sep. 14, 2017 (6 pages).
Canadian Exam Report for Application No. 2,813,464 dated Oct. 6, 2017 (6 pages).
Japanese Office Action for Application No. 2013-532860 dated Aug. 25, 2015 (4 pages).
Japanese Office Action for Application No. 2016-020604 dated Feb. 28, 2017 (5 pages).

* cited by examiner

SYSTEM AND METHODS FOR FACILITATING OPTIONS AND/OR FUTURES

PRIORITY CLAIM

This application claims priority to U.S. Provisional Application No. 61/389,529, filed on Oct. 4, 2010, entitled "System and Methods for Facilitating Options and/or Futures," which is hereby incorporated herein by reference.

FIELD

Some embodiments may relate to trading in options (e.g., binary options), futures, and/or other financial instruments.

BACKGROUND

Marketplaces and exchange may allow traders to buy and/or sell previously listed financial instruments by submitting orders to buy or sell those instruments.

DETAILED DESCRIPTION

Figure 1:
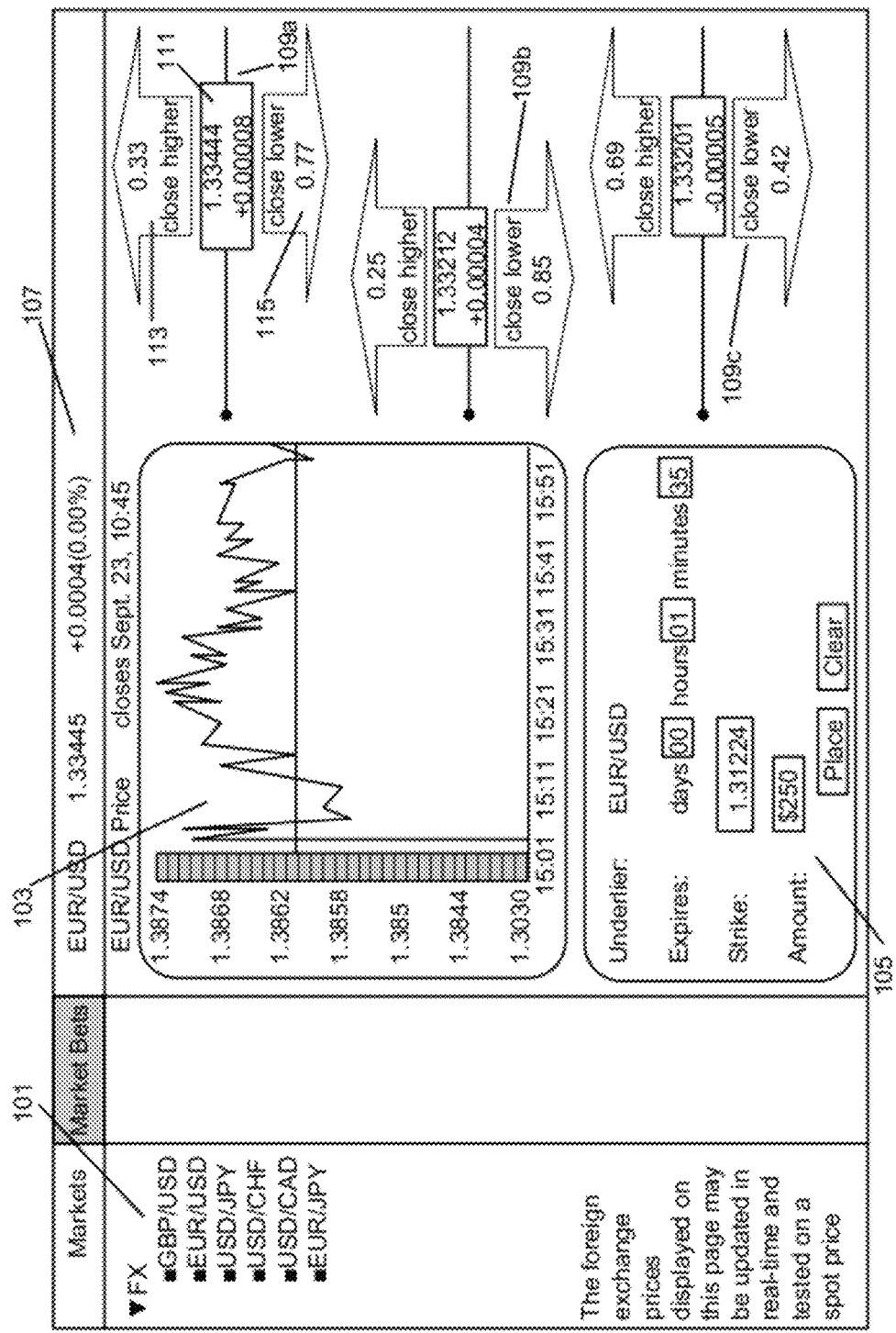
FIG. 1 illustrates an example interface according to some embodiments.

Some embodiments may include selling, buying, trading, forming, bundling, manipulating, valuing, transforming, facilitating, deriving, marketing, planning, exchanging, determining, tracking, and/or any desired action related to one or more financial instruments. Such financial instruments may include one or more options, futures, securities, bonds, stocks, equities, currency, derivatives, swaps, and/or any desired financial instrument. In some embodiments, such financial instruments may include binary options.

Some embodiments may include one or more computing devices, systems, apparatus, alternative trading systems, marketplaces, exchanges, web interfaces, web browsers, mobile devices, cellular telephones, personal computers, processors, servers, and/or any desired device operable to perform, configured to perform, storing instructions related to, engaged in performing, and so on any desired action(s) related to one or more financial instruments.

Examples of Binary Options Embodiments

In some embodiments, an exchange may be established related to binary options. In some embodiments, such binary options may include equity index based binary options. In some embodiments, such binary options may include foreign exchange rate binary options. In some embodiments, such binary options may include intra-day binary options. In some embodiments such options may include contracts between two or more parties. In some embodiments such contracts may be defined by one or more rules that may apply to one or more parties of said contracts.

In some embodiments, a binary options exchange may allow parties to enter into binary option contracts with one another. A binary option exchange may list a binary option that is available for trading. A binary option exchange may allow a seller of a binary option to identify a desire to sell a listed binary option. A binary option exchange may allow a buyer of a binary option to identify a desire to buy the listed binary option. A binary option exchange may facilitate an exchange of a binary option between a buyer and seller with matching desires to trade.

In some embodiments, a strike price and reference price may be used to determine which, if any, of a plurality of parties to a binary option may be entitled to a payment. In some embodiments a binary option may be structured by an exchange such that a buyer is entitled to a payment if a reference price is above a strike price at an expiration time, a seller is entitled to a payment if a reference price is below a strike price at an expiration time, and both a buyer and a seller are entitled to a payment (e.g., half payment) if a reference price is equal to a strike price at an expiration time. These are discussed in more detail elsewhere herein.

Listing

Listing of new binary options may occur in an order book of an exchange. Such listing may be accessible to the public, to other binary option traders, and so on. Such listing may include determining relevant terms for the binary option and allowing trading related to the binary option to occur through the binary option exchange. For example, such listing may include determining an underlying element, determining a strike price, determining a reference price, determining an expiration time, determining a ticker symbol, and/or any desired actions. For example, a listing may include providing a ticker symbol, providing a forum for buyers and sellers to express trading interests, and providing terms of the binary option contract referenced by the ticker symbol.

In some embodiments, a binary option exchange may list new binary options for trading periodically. For example, listing a new binary option may occur every 5 minutes from the opening of trading until one hour prior to the close of trading during each exchange trading day except as otherwise determined or desired. As another example, listing a new binary option may occur hourly. It should be recognized that the frequency of listing is non-limiting and may occur as desired.

In some embodiments, each binary option may be assigned a ticker symbol. Such a ticker symbol may include a symbol related to an underlying element plus HHMM where HHMM is the hour and minute of the contract's expiration (e.g. "WS30_1100", e.g. "GBP_USD_1100"). Such ticker symbols may be used to track prices, buys, sells, interest in, and so on of binary options between listing and expiration.

Once listed, buyers may submit bids and sellers may submit offers related to the listed binary option. The exchange may match such bids and offers to facilitate trading in the listed binary option.

As mentioned above, terms of a binary option may include a strike price, a reference price, an expiration time, and an underlying element. The exchange, prior to listing, may determine such terms so that they may be available upon listing.

Underlying Element

An underlying element may include a financial instrument, a stock, a bond, a futures contract, an index, an exchange rate, and so on. The exchange may provide a set or otherwise desired number of binary options for each of a plurality of underlying elements. Each such element may be associated with binary options having different other terms or treatments, such as different listing frequencies, different trading times, different expiration times, different strike prices, different reference prices, and so on.

In some embodiments, an underlying element may include an index. In some embodiments, a binary option may reference a price of a futures contract on an equity index, an index of futures contracts, and so on. For example, some embodiments may include:

(i) The Wall Street 30 ("WS30") binary option contract: whose underlying reference price may be derived from trades on the nearest calendar E-mini Dow® Futures contracts traded on the Chicago Mercantile Exchange® in the nearest contract in the March, June, September, December cycle that expires at least seven days from the expiration of the WS30 binary option, otherwise the underlying will be the subsequent contract in the cycle;

(ii) The Tech 100 ("T100") binary option contract: whose underlying reference price may be derived from trades on the nearest calendar E-mini NASDAQ 100® Futures contracts traded on the Chicago Mercantile Exchange® in the nearest contract in the March, June, September, December cycle that expires at least seven days from the expiration of the T100 binary option, otherwise the underlying will be the subsequent contract in the cycle; and/or (iii) The US 500 ("US500") binary option contract: whose underlying reference price may be derived from trades on the nearest calendar E-mini S&P 500® Futures contracts traded on the Chicago Mercantile Exchange® in the nearest contract in the March, June, September, December cycle that expires at least seven days from the expiration of the US500 binary option, otherwise the underlying will be the subsequent contract in the cycle.

In some embodiments values for such futures contracts may be obtained from a reporting place, such as an exchange. Such values may be used in relation to a strike price and/or reference price as discussed elsewhere herein.

As another example, a binary option may reference an index of a currency exchange rate, trades in currencies, and so on. For example, some embodiments may include indices calculated for currency pairs:

(i) U.S. dollars per British pound ("GBP_USD");
(ii) U.S. dollars per Euro ("EUR_USD");
(iii) Japanese yen per U.S. dollar ("USD_JPY");
(iv) Swiss francs per U.S. dollar ("USD_CHF");
(v) Canadian dollars per U.S. dollar ("USD_CAD"); and/or
(vi) Japanese yen per Euro ("EUR_JPY").

In some embodiments, the exchange may determine indices for such currency pairs based on a last number of spot quotations for such currency pairs. For example, such indices may be determined by continuously taking the midpoint of the last eight spot quotations for each currency pair exchange rate received by the exchange. In some embodiments, some values may be removed from the most recent quotations when determining such indices. For example, a highest and lowest one and/or two values from the most recent quotations may be removed. An average, mean, median, and/or mode may be determined from the quotations after removing any desired values as the value for each currency pair index. Such index may be rounded as desired, such as to the fourth decimal place and/or second decimal place. Such index for each currency pair may be used in relation to a strike price and/or reference price as discussed elsewhere herein.

It should be recognized that these binary options are given as examples only and that other embodiments may include binary options defined by other rules, referencing other equity indexes, referencing non-equity indexes, referencing any index, referencing non-indexes, referencing financial instruments of any sort including but not limited to bonds, stocks, indexes, futures, options, derivatives, puts, calls, and so on.

In some embodiments, binary options may not relate to an underlying financial element, but rather to some other type of element or no underlying element at all. For example, in some embodiments, a binary option may relate to an underlying poll of political candidates, an underlying chance of a weather event happening, and so on. For example, a binary option may relate to a poll of a democratic candidate for president in a primary race (e.g., a binary option may pay to a buyer if a particular poll is above a threshold level at a time and pay to a seller if the poll is below the threshold level at the time). As another example, a binary option may relate to an outcome of a presidential race (e.g., a binary option may pay to a buyer if a candidate wins a particular race or pay to a seller if a candidate losses a race). As yet another example, a binary option may relate to whether or not a hurricane happens in a particular location, city, county, country, etc. (e.g., a binary option may pay to a buyer if a hurricane happens in the time frame and may pay to a seller if the hurricane does not happen in the time frame).

In some embodiments, a user may generate a custom index or underlying benchmark. For example, a user may identify that an underlying index related to a binary option should be based 50% on the value of a DJIA and 50% on the value of the S&P 500. As another example, a user may select a real estate index in LA and New York to be combined to form a custom index, a poll of multiple presidential candidates to be combined in some manner, and so on. It should be recognized that any manner of combining measurable elements may be used and combined together in any combination whether similar or different to generate a custom reference element on which a binary option may be based. An exchange may determine an outcome of the binary option based on a comparison of a strike value with the value of the custom reference index at an expiration time.

Expiration Time

An expiration time may include a time at which a binary option expires. As discussed elsewhere herein, one or more actions maybe occur at an expiration time. Such actions may be defined by the binary option contract. Such actions may be facilitated by the exchange.

In some embodiments, an expiration time may be determined based on a listing time (e.g., one hour after such listing time). In other embodiments, such expiration time may be chosen by a listing party, and/or determined in any desired manner. In some embodiments, a binary option may begin trading when it is first listed, when it is received for listing, and so on as desired. In some embodiments, a binary option may cease trading at its expiration time and/or some time relative to its expiration time (e.g., 1 minute before its expiration time).

In some embodiments, each binary option may be automatically exercised and/or settled at its expiration time and/or a time relative to its expiration time. Some embodiments may include a cash settlement. Some embodiments may include no provision for early exercise. Such exercising and/or settling may include making a payment from a seller to a buyer, from an exchange to one or more of a buyer and/or a seller and/or any other desired actions.

In some embodiments, an event may take the place of a threshold time. For example, a political race ending or winner of the race being announced may end a binary option that is based on the outcome of such a race. A hurricane or other type of event happening may end a binary option that is based on whether or not such an event will happen in the time.

Reference Price

In some embodiments, each binary option may include a method of determining a reference price. The reference price may be determined by the exchange according to the method at a desired time, such as at or after an expiration time. The reference price may be used to determine which if any actions to take at or after an expiration time to settle a binary option.

In some embodiments, at the time of expiration of a binary option, the exchange may calculate a reference price for each binary option based on some number of last trades of an underlying element reported by a desired reporting source. For example, one such reporting source may include an exchange on which the last trades were performed, such as the Chicago Mercantile Exchange. The last trades may include trades occurring prior to the expiration time. The number of last trades may include 1, 5, 8, 10, 20, 100, and so on as desired. Such number may be based on a volatility of the trades, a volatility of a market, a liquidity of the market, and so on (e.g., a larger number of last trades may be used for more volatile markets to achieve a more stable price, a smaller number of last trades may be used for more volatile markets to capture a more accurate spot price). Such last trades may include, for example, last trades related to an index underlying the binary option, last trades related to currency pairs underlying the binary option, and/or any other last trades. For example, for the WS30, T100, and US500 binary option contracts as discussed elsewhere herein, last trades may include last trades of the underlying futures contracts as reported by the Chicago Mercantile Exchange.

In some embodiments, a portion of the last trades may be removed or otherwise ignored when determining such a reference price. For example, some number of a highest and lowest values may be removed or otherwise ignored. For example, a highest and lowest 1 value, a highest and lowest 2 values, a highest and lowest 5 values, and so on may be removed or otherwise ignored. It should be recognized that the number of highest and lowest values may be the same or different as desired. In some embodiments, some percentage of last trades may be removed or otherwise ignored as desired.

In some embodiments, the reference price may be determined based on an average, a mean, a mode, a median, and so on of the last occurring trades removing and/or ignoring any desired trades (e.g., based on the 4 trades remaining after removing the highest and lowest 2 trades from the last 8 trades). It should be recognized that this example of determining a reference price is a non-limiting example only. Other methods involving multiple sources, single reference trades, estimation, and so on may be used in some embodiments as desired.

In some situations, less than a desired number of trades may occur in a time period prior to the expiration time. For example, if a desired number of trades for determining the reference price is 8 and fewer than 8 trades have occurred in a desired time period prior to the expiration time, an alternative method of determining the reference price may be used. In some embodiments, the time period may include a day, a minute, two minutes, five minutes, 30 seconds, and so on. The time period may be based on a liquidity, a market size, a volatility, and so on. The desired number of trades may include the same number of last trades discussed above and/or may include some other number, such as a threshold minimum number that may be acceptable. In such a case, any number at or above the threshold minimum number may use one method and any number below may use another method. Such a threshold minimum number may be based on a liquidity, a market size, a volatility, and so on.

For example, in some embodiments, an entity may use any method in its own discretion for calculating such an alternative measure of the reference price. Such methods may include using the best available indicative prices of the referenced market (e.g., futures market). Such methods may include using trades that are older than the time period, using fewer trades than the threshold, using trades of other financial instruments (e.g., components of an index), and so on.

As discussed elsewhere herein, in some embodiments, an underlying element may include a value of an index determined based on quotations (e.g., spot quotations of currency pairs). In some such embodiments, a value of a reference price may include a value of the index at an expiration time of a binary option.

Strike Price

In some embodiments, each binary option may include a strike price. In some embodiments, a strike price may be used to determine (e.g., in combination with a reference price) which if any actions should be taken at or after an expiration time. For example, in some embodiments, if a reference price is above a strike price at the expiration time, a buyer may be entitled to a payment (e.g., a pre-determined payment), if a reference price is below a strike price at the expiration time, a seller may be entitled to a payment (e.g., the pre-determined payment), and if a strike price is equal to a payment, both the buyer and the seller may be entitled to a payment (e.g., half of the pre-determined payment).

In one example, if at the time of expiration the reference price is above the strike price each purchaser may be entitled to receive one hundred dollars ($100.00); if at the time of expiration the reference price is below the strike price, each seller may be entitled to receive one hundred dollars ($100.00); if at the time of expiration the reference price is equal to the strike price, each purchaser and each seller may be entitled to receive fifty dollars ($50.00).

In some embodiments a strike price may be determined for a binary option based on a reference price of a prior binary option. For example, the reference price may include a reference price most recent to the listing of the binary option. Such reference price may be rounded to a nearest whole number value of dollars and/or cents. For example, for the WS30, T100, and US500 binary option contracts as discussed elsewhere herein, each contract may have a strike price determined by taking an underlying reference price just prior to its listing and rounding to the nearest whole number value that is:

Divisible by 40 for Contracts on the Wall Street 30 ("WS30");
Divisible by 10 for Contracts on the Tech 100 ("T100");
Divisible by 4 for Contracts on the US 500 ("US500").

In some embodiments, similar methods for determining the prior reference price as described above for determining the reference price may be used. In some embodiments, such prior reference price may be determined for other binary options. In some embodiments, the strike price may be selected by a party listing the binary option.

As discussed elsewhere herein, in some embodiments, an underlying element may include a value of an index determined based on quotations (e.g., spot quotations of currency pairs). In some such embodiments, a value of a strike price may include a value of the index at a desired time. For example, a strike price may include a value at or just prior to the listing of the binary option.

In some embodiments, the strike price may be the same for the buyer and the seller. In other embodiments, the strike price may be different for the buyer and the seller. For example, the buyer may be entitled to a payment if the reference price is above a first strike price and the seller may be entitled to a payment when the strike price is below a second strike price. The strike prices may overlap such that both parties may be entitled to a payment, may not overlap such that only one party may be entitled to a payment, and so on.

Some embodiments may include a plurality of strike prices associated with different distributions of payments to the buyer and/or the seller depending on the relationship of a strike price and a reference price. For example, in some embodiments if a reference price is above a first strike price the buyer may be entitled to a full payment, if the reference price is below a second strike price, the seller may be entitled to a full payment, and if the reference price is between the first and second strike prices, the buyer and seller may each be entitled to some partial payment. Such a partial payment may be larger for the buyer as the reference point becomes near to the first strike price and conversely larger to the seller as the reference price becomes nearer to the second strike price In some embodiments, the payment may vary based on a magnitude of a distance between the reference point and the strike price. In some embodiments, a payment may be the same regardless of such a difference. In some embodiments, a payment may be the same and/or different for the buyer and the seller.

It should be recognized that although some mention of above and below is made in some embodiments above without a mention of equal to, that equal to may be treated the same and/or differently in various embodiments as desired.

Comparing a strike price and a reference price may include comparing an exact number, an approximation of a number, a number rounded to some level as agreed by the parties involved.

It should be recognized that while the above descriptions have made reference to a single reference price at a single reference time, that some embodiments may include multiple reference prices and any number of times involving any number of underlying financial instruments in any combination as desired.

Trading

In some embodiments, a desire to engage in trading may include a price at which a buyer desires to trade, and/or a price at which a seller desires to trade. In some embodiments, such an amount of money may be referred to as points where in one point corresponds to one dollar. In some embodiments, increments of points may be changed by a minimum of 1 (i.e., no half points). Other embodiments may include fractional points.

In some embodiments, quotes of a binary option may include quotes of a last traded price, quotes of a best offer or best bid, quotes of a midpoint of a best offer and best bid, and so on.

In some embodiments, an exchange may match parties having a same bid and offer price to form a new binary option between the two parties. In some embodiments, a matching bid and offer price may occur when the offer price equals the payout minus the bid price. Two parties that have matching interest in a listed binary option may be matched to form a trade in the binary option. The trade may include creating a new binary option for the parties.

In some embodiments, prices may correspond to a portion of a payout amount that each party may be responsible for posting to an account to maintain a margin balance such that the exchange does not maintain a risk in the trade. For example, in a binary option having a potential payout of 100 dollars, a trade at a price of 50 dollars may indicate that a buyer must post 50 dollars and that the seller must post the remaining 50 dollars. As another example, a trade at a price of 30 dollars may indicate that a buyer must post 30 dollars and that a seller must post the remaining 70 dollars. In some embodiments, an amount that a buyer may post may be determined by the purchase price and an amount that a seller must post may be determined by (payout—purchase price).

In some embodiments, such amounts may be maintained in an account with the exchange, and/or elsewhere such that the total payout amount may be available at the expiration time. For example, a margin may be given to some traders based on a relationship with an exchange, known collateral, and so on. Such funds may be used to make the payout determined to be due at the expiration time based on a relationship between the strike price and the reference price.

It should be recognized that such posting of money is given as an example only and that other embodiments may use various other methods as desired. For example, in some embodiments, both parties may pay an amount to the exchange and the exchange may pay the parties at the expiration time. In some embodiments, one party may pay the other party an amount and that other party may be responsible for paying any payout at the expiration time. It should be recognized that any desired flow of funds may be used to implement a buying, selling, and settlement of a binary option as desired.

In some embodiments, each binary option may be for a payout value of 100 dollars. Any number of such contracts may be traded in such increments. Such an increment is given as an example only. Multiple payout values of a same binary option may be traded. A quote for the binary option may be based on a standard payout value such as 100 dollars.

Prices of bids and/or offers throughout the trading period may change as a current value of an underlying element changes and/or as a time until an expiration time nears. For example, as it appears more certain that a reference price will be above a strike price at an expiration time, a price may increase.

Although references to buyers and sellers are made, it should be recognized that such terms are used in some embodiments, only for convenience sake and that there may not be a buyer and/or seller as may traditionally be understood in some exchanges.

Some embodiments may include restricted trading hours regarding binary options. For example, some embodiments may allow trading, buying, selling, and so on of binary options, Monday through Friday, beginning at 6:00 PM the prior evening (Sunday through Thursday) until 4:15 PM each weekday. Some embodiments may allow trading, buying, selling, and so on of binary options Sunday 6:00 PM until Friday 3:00 PM. Some embodiments may include abbreviated holiday trading schedules may. Such hours may be based on hours of an exchange used to determine the reference price.

In some embodiments, binary options may be related to a 10,000 contract net short or net long position accountability level. A position of 10,000 net short or long constitutes a reportable position and may require any person owning or controlling such position to provide information to the exchange regarding the nature of the position, trading strategy, and hedge purpose as applicable. Such level is given as an example only.

Examples of Futures Embodiments

Some embodiments may relate to trading of futures contracts. Such futures contracts may be related to an underlying element. Such futures contracts may start trading at any time and may expire at any time after they start trading. The futures contract may cash settle at the expiration time. Some embodiments may include daily futures contracts based on one or more spot currency exchange rate indices.

For example, a futures contract may be based on any underlying element. In some embodiments, such an underlying element may include a currency exchange index for a pair of currencies as discussed elsewhere herein.

A futures contract may be based on some size (e.g., a size of an amount of an underlying element). For example, a futures contract may be based on a right to trade a first currency for a second currency at an expiration time, a right to buy and/or sell an amount of a financial instrument, and so on. In some embodiments such an amount may be based on a US dollar value (e.g., 10,000.00, 100.00), a dollar amount multiplied by an index value (e.g., 10,000.00 multiplied by a value of an index at or prior to the time of listing such as an index of an exchange rate as discussed above), and so on. At an expiration time, a settlement may occur whereby the buyer of the futures contract receives the amount of money. For example, if an exchange rate index for US dollars per UK pound has a value of 2 at a time of listing a futures contract, the size of a contract may be $20,000 dollars and at an expiration time a buyer of the contract may receive $20,000. The currency received may be either dollars or pounds in such an example as desired by the exchange and/or parties.

Futures contracts may be listed for trading as desired by an exchange, such as hourly, daily, and so on. In some embodiments, a futures contract shall be listed and or otherwise begin trading one hour prior to an expiration of a previously futures contract expiration time. Listing may include identifying an exchange rate, identifying an expiration time, identifying a ticker symbol, and/or allowing trading.

Each futures contract may be assigned a unique ticker symbol. For currency futures contracts, such a ticker symbol may include a currency pair code plus MMDDYY where MMDDYY is the month, day, year of the Contract's expiration (e.g. "GBP_USD$_{093010}$").

In some embodiments an exchange may quote prices related to trading of futures contracts. For example, some embodiments, futures contracts may be quoted as an index to some number of decimal places (e.g., zero, two, four). The minimum trading increment of such a futures contract may be related to the number of decimal places (e.g., may be the same).

In some embodiment, a futures contract may cease trading at a designated time corresponding to its expiration date. In some embodiments, the designated time may be the expiration time. For example the expiration time may be 3 pm. Accordingly, in some embodiments, a listing may take place at 2 pm on one day and that listing may expire at 3 pm the following day.

In embodiments, between listing and closing, buyers may post bids and offers for the listed futures contract. Such bids and offers may be matched and a futures contract based on the underlying element may be created between the matched parties. The buyers may pay the sellers the matched amount of money at the time of matching and the seller may pay the buyer the size or value of the futures contract at the expiration time. Futures contracts may be automatically cash settled by the exchange at or around the expiration time.

A position of 10,000 net short or long constitutes a reportable position and may require any person owning or controlling such position to provide information to the exchange regarding the nature of the position, trading strategy, and hedge purpose as applicable. Such level is given as an example only.

Some embodiments may include a required posting of an amount of money for one or more parties to a futures contract. For example, some embodiments may require a seller to post an amount of money corresponding to an amount that the sell may be required to pay at the expiration time. Some example amounts may include $350.00 ("GBP_USD"); $300.00 ("EUR_USD"); $250.00 ("USD_JPY"); $220.00 ("USD_CHF"); $220.00 ("USD_CAD"); and/or $350.00 ("EUR_JPY"). The Exchange may conduct periodic reviews of each such margin rate and may establish rates that differ from these as desired. In some embodiments, a minimum 2% notional value of the contract may be required.

Examples of Flexible Binary Options Embodiments

Some embodiments may include flexible financial instruments. Such flexible financial instruments may include instruments for which a user may specify one or more parameters. An exchange may generate a listing for such a financial instrument, create a public market for such a financial instrument, accept bids and/or offers for such a financial instrument, match bids and/or offers for such a financial instrument, form such financial instruments between matching buyers and sellers, and/or perform any desired action regarding such a financial instrument in response to receiving a request for such a financial instrument from a user. Such a request may be referred to as a request for listing and/or a request for quote.

In some embodiments, such a financial instrument may include a binary option. In some embodiments, such a financial instrument may include a futures contract, a security, and/or any other type of financial instrument, non-financial element, event and so on as desired. Some examples of binary options and/or futures are given elsewhere herein. It should be recognized that discussions related to a flexible financial instrument may relate to any other discussion herein such as those regarding futures and/or binary options.

In some embodiments, a user may submit a request for listing of a binary option through a user interface of a computing device. In some embodiments, such an interface may include an interface having one or more arrows that may be used to control one or more parameters. An example of such an interface is given in U.S. patent publication number 2005/0197948 to Davie entitled System and Method for Wagering in a Financial Market Environment, which is hereby incorporated herein by reference. Another example interface is discussed below.

In some embodiments, a user may specify one or more desired parameters for a binary option and/or other financial instrument. For example, in some embodiments, a user may specify a duration and/or an expiration time of the binary option. In some embodiments, a user may specify an underlying element, such as an index, an exchange rate, a poll, an event, and so on. In some embodiments, a user may specify a strike price. In some embodiments, a user may specify a listing time, a payout amount, a reference price determining method, and/or any desired parameter. In some embodiments, default parameters may be used for some parameters if a user does not specify a parameter or is not given an option to specify the parameter. For example, in some embodiments, a same method for determining a reference price may be used for all binary options.

Some embodiments may include restrictions for one or more parameters. For example, some embodiments may require a date, hour, and minute of expiration for new binary options. In some embodiments such an expiration date may not be more than 180 days away from the submission of the request. In some embodiments, a strike price may be specified to a level of accuracy that may be limited. For example, for a currency rate financial instrument, some embodiments may allow three significant digits for some currency pairs ("GBP_USD", "EUR_USD", "USD_CHF", "USD_CAD"), one significant digit for some currency pairs ("USD_JPY", "EUR_JPY"), and so on.

In some embodiments, in response to receiving information requesting a listing of a financial instrument, an exchange may list the financial instrument having the specified parameters. Listing may include assigning a unique ticker symbol to the financial instrument. For example, for exchange rate related binary flex option contract, a unique ticker symbol including a currency pair code plus MMDD_hhmm where MMDD is the month and day and hhmm is the hour and minute of the Contract's expiration (e.g. "GBP_USD_1215_1100") may be assigned. In some embodiments, listing may include allowing trading of the financial instrument to occur through the exchange.

In some embodiments, in response to receiving information requesting a listing, an exchange may contact one or more market participants to provide an initial pricing level for the requested listing. For example, an exchange may receive information identifying a desired binary option and may contact a set of market makers associated with the exchange and/or any other desired entities. The market makers may process the information and return a bid and/or offer for the requested binary option. The exchange may receive any number of bids and/or offers from the respective one or more market makers. In some embodiments, the exchange may take the best bid and best offer provided form the set of market makers to form an initial market for the binary option.

In some embodiments, users may submit bids and/or offers regarding such listed financial instruments. Such bids and offers may be matched between traders and/or with a market maker and a trader to generate a trade. A financial instrument may be generated between parties that have submitted a respective marching bid and offer. In some embodiments, along with information identifying one or more parameters for a new listing of a financial instrument, a user may submit information for a price of a bid and/or offer for some number of the financial instrument. Such price information may be used to submit an order for the financial instrument having that price on behalf of the user that submits the parameter information. Such submission of pricing information by the user that submits the parameter information may be optional, and/or may be required. In some embodiments, a user that submits such parameters may be notified of bids and/or offers submitted subsequent to the submission of the parameters (e.g., until the end of the listing, the first number of bids and/or offers, for a period of time).

It should be recognized that in some embodiments that utilize the formation of a market on demand from market maker bids and offers, such an exchange may provide traders with the ability to have their own desired financial instruments (e.g., binary options) listed on an exchange with an initial market quote formed on demand for an instrument of their own desire.

In some embodiments, an exchange may settle a financial instrument, such as a flexible binary options contract, at and/or or after an expiration time. Various examples of settling binary options contracts are given elsewhere herein. Various parameters of settlement may be specified by a user upon submission for listing of a new financial instrument (e.g., an amount of payout to each party, a strike price, and so on).

In some embodiments, the financial instrument may be removed from listing at some time relative to an expiration time. For example, a listing may be removed at an expiration time, an hour before an expiration time, and so on.

It should be recognized that various examples of flexible financial instruments are given as non-limiting examples only and that various embodiments may include some, all, or none of the features described herein.

Secondary Trading

Some embodiments may allow secondary trading of a binary option, a future contact, and/or a flexible financial instrument. Such secondary trading may allow a buyer and/or seller to transfer rights and/or responsibilities related to the binary option, future contract, and/or flexible financial instrument to another person. For example, sellers may submit orders to sell and buys may submit orders to buy. The orders may be matched together and/or new contracts may be formed or existing contracts may be transferred. In some embodiments, there may be no secondary trading, but rather new contracts may be formed for each trade. An exchange may track possible loss risk to a traders account based on the amount of instruments that a trader is involved with. The exchange may offset opposing instruments to reduce the loss risk (e.g., a trader buys a contract for one option and sells a contract for the same option so that their risks offset and the total risk to the trader is zero).

In some embodiments, traders may be allowed to engage in trading through an exchange up to some risk tolerance and/or equity or account amount. For example, a trader may be able to engage in trading such that the risk to the trader is equal to an amount of collateral that the trader has registered with the exchange. In some embodiments, the trader may be allowed to engage in trading up to some multiple of that collateral (e.g., a percentage, 0.8 times, 1.2 times, 5 times, etc.).

Some embodiments may allow a trader to submit orders that exceed a trading limit (e.g., orders to trade that would result in a risk tolerance being exceeded). As the orders are executed (e.g., in a designated priority order, in a FIFO order, in an order based on when matches for the orders are found, etc.), a distance from the trading limit may be adjusted. In some embodiments, offsetting trades may occur to give a trader additional room before reaching the trading limit. Accordingly, a real time analysis of a traders distance from a trading limit may be maintained, monitored, and/or followed.

In some embodiments, if a trader reaches a trading limit, the trader may be prevented from trading until and/or unless the trade submits more collateral (e.g., cash into an account), offloads some risk (e.g., obtains offsetting risk, unwind contract positions, etc.) and/or take some action designated by the exchange (e.g., request margin limits be extended, pass a credit check, etc.). If an order being fulfilled would place a trader over a limit, the order may be prevented from being executed in some embodiments (e.g., an order for 5000 but a risk only allowing 3000 from being purchased may be prevented in its entirety). In some embodiments, a portion of such an order that would be allowed under the trading limit may be executed (e.g., the 3000 portion may be allowed leaving 2000 unfilled). In some embodiments, the 2000 remaining order may be canceled and/or maintained as a pending order for when/if the trader is allowed to trade again.

In some embodiments, a trader may be notified of an approaching trading limit, of a reached trading limit, if an order is prevented from being executed because of a trading limit, if only a portion of an order is executed because of a trading limit, and so on. A trader may be asked how to proceed when a trading limit is reached. For example, if a part of an order is executed, an interface may ask the trader whether the remaining order should pend or be canceled. Various information about a trading limit may be accessible and/or adjustable through a computer interface through which notices and/or fund transfers may be communicated to and/or from a trader as desired.

Interface

FIG. 1 illustrates an example interface that may be used in some embodiments. Such an example interface may be presented to one or more traders by one or more computing devices. Such a computing device may communicate information to an exchange based on activation of one or more controls of the interface and/or information entered into the interface. Such a computing device may receive information from the exchange and display that information through the interface. Such information may include information requested by the computer device based on actions taken by one or more traders (e.g., controls activated, markets selected, movement of a mouse, and so on). A computing device may execute instructions stored one more or more media (e.g., a non-transitory computer readable medium) that allows the computing device to display and operate such an interface. An exchange may execute instructions stored on one or more media that allows the exchange to perform matching, listing, and/or other functions that may include interacting with one or more computing devices used by traders and displaying such interfaces. It should be recognized that other interfaces may be used as desired and that this interface is given as a non-limiting example only. It should be recognized that some embodiments may include computer implemented trading algorithms rather than human traders. In some embodiments, such computers may be considered traders and/or may use same and/or different interfaces and/or communication methods than human traders.

The example interface includes a panel 101 through which a trader may select a desired underlying instrument (e.g., a foreign exchange index related to the price of Euros compared to U.S. dollars). A trader may browse possible instruments and/or request a new instrument through such a panel in some embodiments. Information populating this panel may be obtained from the exchange (e.g., currently available instruments). For example, as a user selects a type of instrument (e.g., FX, the computing device may request currently available FX instruments and populate the panel in response). In some embodiments, an indication regarding which such instruments are actively in trade may be made (e.g., if a market for the instrument is active or a market for binary options in the market is active (e.g., open for trading hours) then a identifier may indicate as much (e.g., a word may be a different color, an icon may be next to a word, etc.)).

The example interface includes a panel 103 through which a trader may view information about a selected instrument. As indicated, an intraday chart for the last hour is shown. This information may be obtained from the exchange or other source by the computing device in response to a user selecting an instrument. The user may operate one or more controls to adjust the displayed information (e.g., add more charts, change charts, increase or decrease a time frame or level of zoom, etc.).

The example interface includes a panel 105 through which a trader may enter information to request a new instrument be listed. For example, in the illustration, a user may identify an expiration time, a strike price, and an amount for a new binary option based on the selected Euro to US Dollar index. By activating a place control (e.g., the place button), the trade may submit a request to the exchange to have the instrument listed for trading on the exchange.

The example interface includes a panel 107 through which a trader may view available instruments that relate to the selected underlying instrument. For example, in the illustration, three frames 109 *a*-*c* that relate to three separate binary options markets. Information populating these frames may be obtained from an exchange in response to a selection of the underlying instrument, a selection and/or adjustment of a time, and/or a selection and/or adjustment of a strike price. It should be recognized that three frames are shown as an example only and that other embodiments may include any number as desired (e.g., a number based on an interface resolution and/or size).

The frames may be arranged in strike price vertical order (e.g., highest strike price on top, lowest strike price on bottom). A user may use the interface to show different strike prices (e.g., by operating a scroll wheel, by dragging a mouse, by pressing an up or down button, and so on). In response to receiving input from a trader (e.g., an up button press), higher strike prices may be shown (e.g., the next highest x number may be added to the top and the lowest x number may be removed). Accordingly, a trader may scroll up and/or down the set of instruments to display a desired frame. Some embodiments may include an interface element through which a user may enter a strike price to jump to that price area.

The frames may relate to a single expiration time and/or multiple expiration times. In some single expiration time embodiments, each of the frames may relate to a single time regardless of currently displayed horizontal positioning. The frames may be arranged in a different horizontal location to maximize panel space usage. Next or prior times may be shown by moving left or right though the panel (e.g., moving a scroll wheel left or right, pressing a left or right button, dragging a panel left or right, and so on). A next time may include a closest time that has a listed binary option, and/or a closest time some "tick" away (e.g., a default value, 1 minute, 5 minutes, etc.). For example, pressing a right button may cause the interface to replace the current frames with frames related to one minute later than the current frames. Information to populate such frames may be obtained from the exchange. Accordingly, a trader may scroll through frames to select a desired time. Some embodiments may include an interface element through which a user may enter a time to jump to that time.

In some multiple expiration time embodiments, frames may be arranged in a horizontal position based on time of expiration. So frame 109b may relate to an earlier expiration time than frames 109a and c. A trader may similarly adjust time by scrolling left or right as desired. In some embodiments, time may be listed along a top of the panel. Distance and/or positioning in a horizontal manner may be based on relative time differences.

In some embodiments, a frame (e.g., 109a) may include may include an information element 111, a buy control 113, and/or a sell control 115. An information element may display information related to the binary option. For example, the strike price, expiration time, and so on may be displayed there. Such information may include information identifying the current situation of the binary option (e.g., whether the underlying instrument is currently higher and/or lower than the strike price (for example, in element 111, the current price is 0.00008 higher than the strike price)), a market depths for one or more of the buy and/or sell sides, and so on). Such information may be obtained from the exchange.

A buy control and/or sell control may be actuated by a trader to cause a trade to occur. For example, if a user presses a buy button an order to buy (e.g., taking the position that the underlying instrument will end higher than the strike price) may be placed. Information identifying that order may be sent to the exchange. The exchange may attempt to execute the order and notify the trader of the results. Such results may be displayed through the interface or some other interface. An amount to be purchased may include a default amount, an amount entered by a trader, a single instrument, and so on. In some embodiments, a trader may enter the amount through the interface (e.g., in a text box, in a confirmation window that is shown before the order is submitted). In some embodiments, a buy and/or sell control may be arranged to indicate the direction that the instrument must move relative to the strike price to result in a payout. For example, a buy control may be arranged to indicate an upward movement (e.g., an up arrow).

It should be recognized that the interface is given as an example only and that other embodiments may include same, different, and/or no interfaces with similar and/or different elements in any combination as desired.

Example Methods

Figure 2:
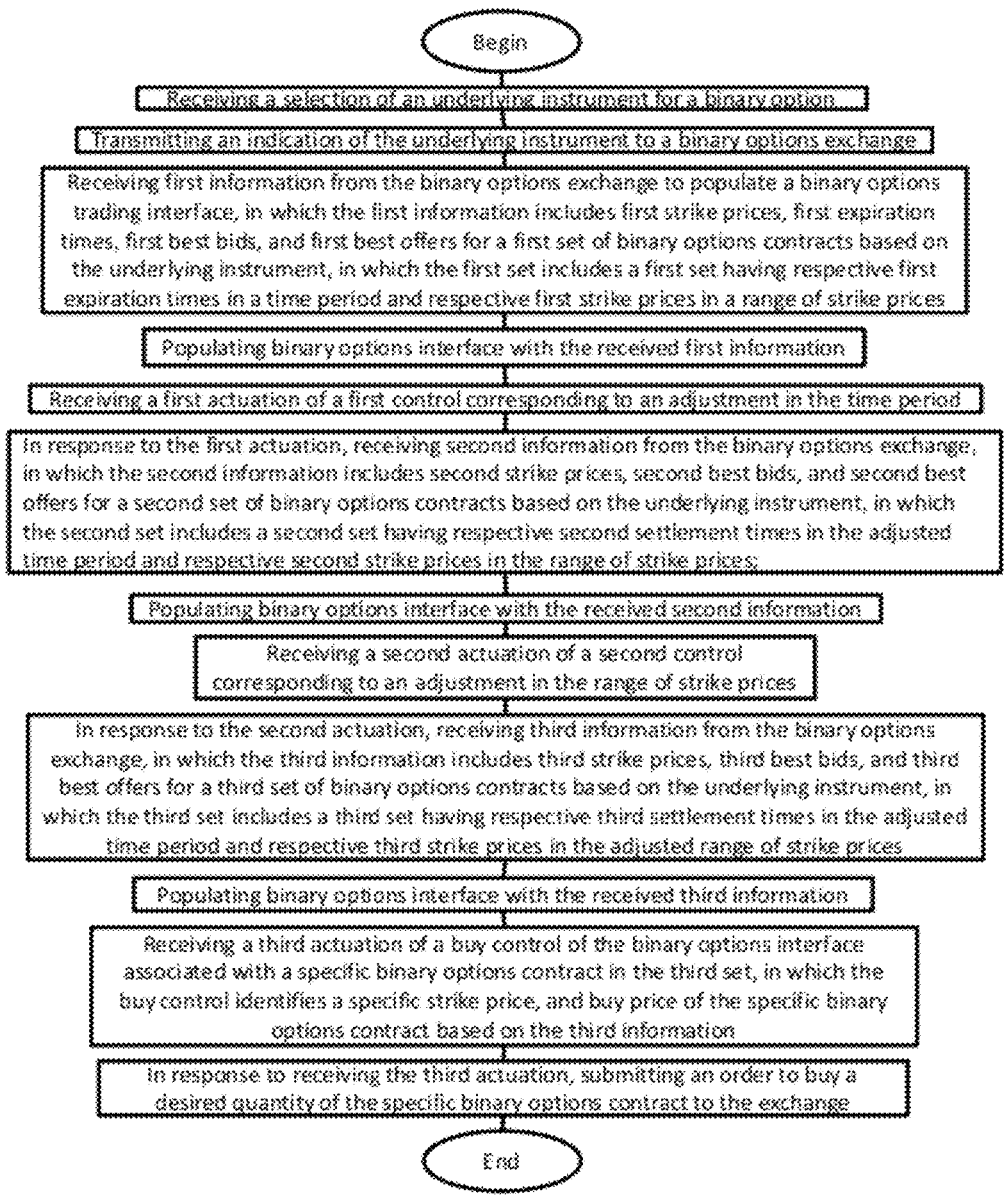
FIG. 2 illustrates an example method according to some embodiments.

FIG. 2 illustrates an example method that may be performed in some embodiments (e.g., by a computing device such as a trader's computing device). Such a method may allow an interface of a computing device to provide binary options trading functionality according to some embodiments. As illustrated, such a method may include receiving a selection of an underlying instrument for a binary option. Such a method may include transmitting an indication of the underlying instrument to a binary options exchange. Such a method may include receiving first information from the binary options exchange to populate a binary options trading interface. In some embodiments, the first information includes first strike prices, first expiration times, first best bids, and first best offers for a first set of binary options contracts based on the underlying instrument. In some embodiments, the first set includes a first set having respective first expiration times in a time period and respective first strike prices in a range of strike prices. In some embodiments, the method includes populating binary options interface with the received first information.

Such a method includes receiving a first actuation of a first control corresponding to an adjustment in the time period. Such a method includes in response to the first actuation, receiving second information from the binary options exchange. In some embodiments, the second information includes second strike prices, second best bids, and second best offers for a second set of binary options contracts based on the underlying instrument. In some embodiments, the second set includes a second set having respective second settlement times in the adjusted time period and respective second strike prices in the range of strike prices. Such a method includes populating binary options interface with the received second information.

Such a method includes receiving a second actuation of a second control corresponding to an adjustment in the range of strike prices. Such a method includes in response to the second actuation, receiving third information from the binary options exchange. In some embodiments, the third information includes third strike prices, third best bids, and third best offers for a third set of binary options contracts based on the underlying instrument. In some embodiments, the third set includes a third set having respective third settlement times in the adjusted time period and respective third strike prices in the adjusted range of strike prices. Such a method includes populating binary options interface with the received third information.

Such a method includes receiving a third actuation of a buy control of the binary options interface associated with a specific binary options contract in the third set, in which the buy control identifies a specific strike price, and buy price of the specific binary options contract based on the third information. Such a method includes in response to receiving the third actuation, submitting an order to buy a desired quantity of the specific binary options contract to the exchange.

It should be recognized that various embodiments may include any method including any elements in any ordering as desired and that the illustrated method is given as a non-liming example only.

Figure 3:
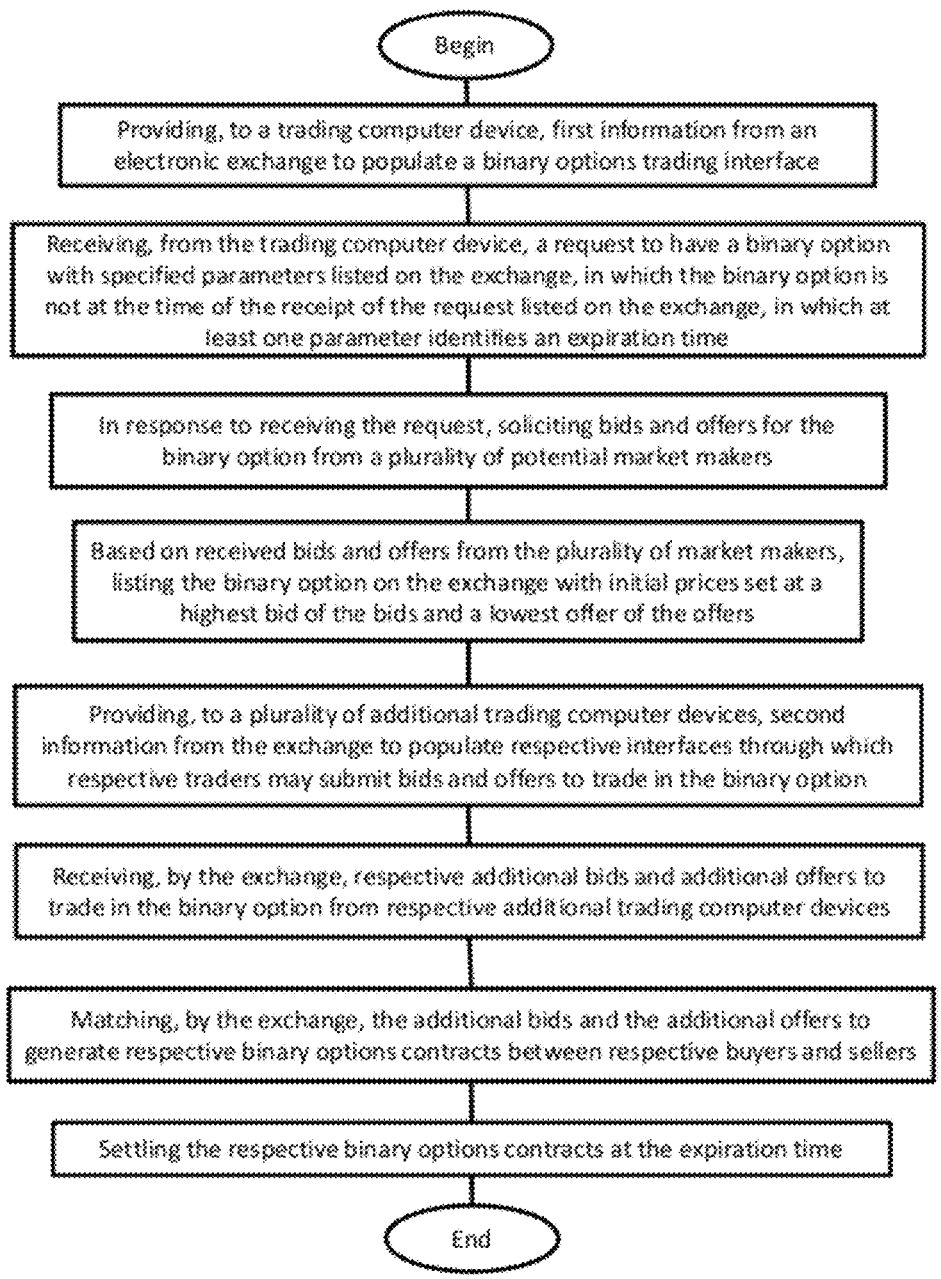
FIG. 3 illustrates an example method according to some embodiments.

FIG. 3 illustrates another example method according to some embodiments. Such a method may be performed by a device of an exchange to facilitate the listing of custom binary options and/or trading related to such options. Such a method may include providing, to a trading computer device, first information from an electronic exchange to populate a binary options trading interface. Such a method may include receiving, from the trading computer device, a request to have a binary option with specified parameters listed on the exchange, in which the binary option is not at the time of the receipt of the request listed on the exchange, in which at least one parameter identifies an expiration time. Such a method may include in response to receiving the request, soliciting bids and offers for the binary option from a plurality of potential market makers. Such a method may include based on received bids and offers from the plurality of market makers, listing the binary option on the exchange with initial prices set at a highest bid of the bids and a lowest offer of the offers. Such a method may include providing, to a plurality of additional trading computer devices, second information from the exchange to populate respective interfaces through which respective traders may submit bids and offers to trade in the binary option. Such a method may include receiving, by the exchange, respective additional bids and additional offers to trade in the binary option from respective additional trading computer devices. Such a method may include matching, by the exchange, the additional bids and the additional offers to generate respective binary options contracts between respective buyers and sellers. Such a method may include settling the respective binary options contracts at the expiration time.

It should be recognized that various embodiments may include any method including any elements in any ordering as desired and that the illustrated method is given as a non-liming example only.

CONCLUSION

It should be recognized that even though some embodiments refer to an exchange, that other embodiments are not so limited. For example, any computing device may be used in some embodiments.

It should be recognized that the described embodiments are given as non-limiting examples only and that other embodiments may include other actions in any desired order, and other systems in any desired combination.

It should be recognized that while elements of a binary options exchange, a futures exchange, and a flexible financial instrument exchange may be discussed separately that none, some, and/or all of the elements discussed with respect to one may apply to the other. Such exchanges may be operated together, separately as one exchange and so on.

It should be recognized that any and all embodiments, elements, features, steps, and so on may be used together in any combination, and/or ordering with or without some, one or more, all, or any particular embodiment, feature, step, element, and so on.

U.S. patent publication 2007/0208642 to Asher and entitled System and Method for Wagering-Based Transferable Financial Instruments is hereby incorporated herein by reference.

Example Embodiments

The following should be interpreted as further example embodiments, and not as claims.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise. The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby"

is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth☐, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function. Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

What is claimed is:

1. A method comprising:
   receiving, from a networked trading computer device, a request to have a binary option with specified parameters listed on an exchange facilitated through an electronic network of trading computer devices, in which the binary option is not at the time of the receipt of the request listed on the exchange, in which at least one parameter identifies an expiration time;
   in response to receiving the request, soliciting bids and offers for the binary option from a plurality of potential market makers;
   based on received bids and offers from the plurality of market makers, initially listing the binary option on the exchange with initial prices set at a highest bid of the bids and a lowest offer of the offers;
   providing, to at least some of the electronic network of trading computers, information from the exchange to populate respective interfaces through which respective traders submit bids and offers for the binary option;
   by trading computers that receives the information, populate a respective interface with an intraday trading chart with price information related to the binary option, and at least two frames arranged in strike price vertical order and an expiration time horizontal order, in which one of the at least two frames is for the binary option and includes an information element displaying the strike price positioned vertically between a buy button and a sell button that when pressed, a trade order for the binary option is submitted;
   in response to a first user input, adjusting, by the computing device, the binary options interface to include a received second information, in which such adjusting includes replacing the at least two trading frames with a second at least two trading frames arranged in strike price vertical order and expiration time horizontal order and each associated with the binary option, in which each frame includes a respective information element displaying the strike price of a respective binary options contract and a respective buy button and sell button that when pressed, a trade order for the binary option is submitted;

receiving, by the exchange from at least four computers of the electronic network of trading computers, respective additional bids and additional offers for the binary option from respective additional trading computer devices in response to presses of respective buy and sell buttons at the at least four computers;

matching, by the exchange, the additional bids and the additional offers and generating respective binary options contracts between respective buyers and sellers; and facilitating, by the exchange, settlement of the respective binary options contracts at the expiration time.

2. The method of claim 1, in which the highest bid is from a first market maker, and the lowest offer is from a second market maker.

3. The method of claim 1, in which generating a respective binary options contract includes: forming a contract that obligates a buyer to pay a seller an amount at the expiration time in response to a reference price being above a strike price.

4. The method of claim 3, in which each bid includes a buyer portion of the amount that the buyer will pay for a particular binary options contract and each offer includes a seller portion of the amount that the seller will pay for the particular binary options contract.

5. The method of claim 4, in which the buyer portion and seller portion sum to the amount, and the amount is held by the exchange until the expiration time.

6. The method of claim 5, in which settling includes providing the amount to at least one of the buyer and the seller based on a comparison of the reference price to the strike price.

7. The method of claim 1, in which settling is performed automatically in response to the expiration time occurring without a request to settle from a trader.

8. The method of claim 1, in which a particular trader of the plurality of traders is prevented from taking on more than an amount of risk based on an amount of collateral available to the exchange associated with the particular trader, in which the risk is based on the amount that the particular trader has the potential responsibility for paying based on binary options contracts entered into by the particular trader.

9. The method of claim 8, comprising:
determining that execution of an order submitted by the particular trader would cause the trader to assume more risk than the amount of risk;
in response to the determination, executing a portion of the order that adds up to the amount of risk to the particular trader.

10. The method of claim 8, comprising: offsetting risk for the particular trader based on offsetting binary options contract positions taken by the particular trader.

11. The method of claim 1, in which the parameters include at least one of a strike price, an underlying instrument, and an amount.

12. The method of claim 1, in which listing the binary option on the exchange include generating a unique identifier that is recognized by the exchange when traders to submit orders related to the binary option.

13. The method of claim 1, in which the expiration time is two minutes away from a time when the request is submitted to the exchange.

14. The method of claim 1, comprising: facilitating secondary trading of generated binary options contracts.

15. A method comprising:
receiving, by a computing device, a selection of an underlying instrument for a binary option contract;
transmitting, by the computing device, an indication of the underlying instrument to a binary options exchange facilitated through a network of computing devices;
receiving, by the computing device, first information from the binary options exchange to populate a binary options trading interface, in which the first information includes first strike prices, first expiration times, first best bids, and first best offers for a first set of binary options contracts based on the underlying instrument, in which the first set includes a first set having respective first expiration times in a time period and respective first strike prices in a range of strike prices;
populating, by the computing device, the binary options interface with the received first information to include an intraday trading chart with price information for the underlying instrument, and a plurality of trading frames arranged in strike price vertical order and expiration time horizontal order and each associated with a respective binary option contract of the first set of binary options contracts, in which each frame includes a respective information element displaying the strike price of a respective binary options contract and a respective buy button and sell button that when pressed, a first respective trade order for the respective binary options contract is submitted;
receiving, by the computing device, a first user input corresponding to an adjustment in the time period;
in response to the first user input, receiving, by the computing device, second information from the binary options exchange, in which the second information includes second strike prices, second best bids, and second best offers for a second set of binary options contracts based on the underlying instrument, in which the second set includes a second set having respective second expiration times in the adjusted time period and respective second strike prices in the range of strike prices;
in response to the first user input, adjusting, by the computing device, the binary options interface to include the received second information rather than the received first information, in which such adjusting includes replacing the plurality of trading frames with a second plurality of trading frames arranged in strike price vertical order and expiration time horizontal order and each associated with a respective binary option contract of the second set of binary options contracts, in which each frame includes a respective information element displaying the strike price of a respective binary options contract and a respective buy button and sell button that when pressed, a third respective trade order for the respective binary options contract is submitted;
receiving, by the computing device, a second user input corresponding to an adjustment in the range of strike prices;
in response to the second user input, receiving, by the computing device, third information from the binary options exchange, in which the third information includes third strike prices, third best bids, and third best offers for a third set of binary options contracts based on the underlying instrument, in which the third set includes a third set having respective third expiration times in the adjusted time period and respective third strike prices in the adjusted range of strike prices;

in response to the second user input, adjusting, by the computing device, the binary options interface to include the received third information rather than the received first and second information, in which such adjusting includes replacing the second plurality of trading frames with a third plurality of trading frames arranged in strike price vertical order and expiration time horizontal order and each associated with a respective binary option contract of the third set of binary options contracts, in which each frame includes a respective information element displaying the strike price of a respective binary options contract and a respective buy button and sell button that when pressed, a second respective trade order for the respective binary options contract is submitted;

receiving, by the computing device, a third user input corresponding to a press of a buy button in a particular trading frame of the third plurality of trading frames associated with a specific binary options contract in the third set; and in response to receiving the third user input, submitting, by the computing device, an order to buy a desired quantity of the specific binary options contract to the exchange.

16. The method of claim 15, in which the buy price includes an amount of the specific binary options contract that a trader that performed the third user input is required to pay for a particular binary options contract.

17. The method of claim 16, in which a corresponding sell price is required to be paid by a seller for the specific binary options contract, in which the buy price and sell price sum to the amount.

18. The method of claim 17, comprising: receiving the amount based on a settlement of the specific binary options contract at a specific expiration time because the underlying instrument has a higher price at the specific expiration time than the specific strike price.

19. The method of claim 15, comprising:

receiving, from the exchange, an indication that buying the quantity would exceed a risk threshold associated with an amount of collateral identified by the exchange; in which the indication identifies that a trade for an amount of the quantity that would not exceed the risk threshold has been fulfilled.

20. The method of claim 15, in which the specific binary options contract includes a binary options contract that is listed on the exchange in response to a request to list the specific binary options contract transmitted from the computing device.

* * * * *